(12) United States Patent
Yi

(10) Patent No.: US 12,200,392 B2
(45) Date of Patent: Jan. 14, 2025

(54) DEVICE PAIRING MAGNIFICATION TOOL

(71) Applicant: Sony Group Corporation, Tokyo (JP)

(72) Inventor: Hyehoon Yi, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 120 days.

(21) Appl. No.: 18/084,418

(22) Filed: Dec. 19, 2022

(65) Prior Publication Data
US 2024/0205358 A1    Jun. 20, 2024

(51) Int. Cl.
| | |
|---|---|
| H04N 5/262 | (2006.01) |
| G06T 3/40 | (2024.01) |
| H04N 7/015 | (2006.01) |
| H04N 7/18 | (2006.01) |

(52) U.S. Cl.
CPC ............ *H04N 5/2628* (2013.01); *G06T 3/40* (2013.01); *H04N 7/015* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 8,743,143 B2 | 6/2014 | Choi | |
| 8,819,268 B1* | 8/2014 | Sauer | H04M 1/72412 709/248 |
| 10,089,057 B2* | 10/2018 | Dow | G06F 3/1454 |
| 2013/0141331 A1* | 6/2013 | Shiu | G06F 3/1454 345/158 |
| 2013/0328878 A1* | 12/2013 | Stahl | G09G 5/005 345/1.3 |
| 2014/0089847 A1* | 3/2014 | Seo | G06F 3/0488 715/781 |
| 2017/0108997 A1* | 4/2017 | Kim | G06F 40/143 |

FOREIGN PATENT DOCUMENTS

KR    20190041088 A    4/2019

OTHER PUBLICATIONS

VisionAssist; https://appadvice.com/app/visionassist/502356279.

* cited by examiner

*Primary Examiner* — Jason A Pringle-Parker
(74) *Attorney, Agent, or Firm* — Trellis IP Law Group, PC

(57) ABSTRACT

An image magnification system is provided to facilitate display of images on a television screen by pairing a television with a mobile device for magnified viewing. The magnification system utilizes fine-tuning elements on both the mobile device and television to optimize output of images at the television screen. A coupling application of the mobile device communicates with an image display application of the television. A user launches the television image display application by interacting with controls at the mobile device. Digital images, such as photographs, video, etc., are transferred from the mobile device directly to the television where the images can be enhanced prior to display. The magnification system provides for enhanced casting by the television optimizing display settings and/or the image for improved display that is tailored to the viewing needs of the user.

19 Claims, 4 Drawing Sheets

DEVICE PAIRING MAGNIFICATION TOOL

BACKGROUND

Individuals with low vision challenges, such as persons with vision impairments, can use a myriad of dedicated hardware devices such as closed circuit television ("CCTV") and video magnifiers. These devices rely on a dedicated video camera or scanner and their own display screen or a cable to plug into a dedicated screen to magnify items, like text or images. Some dedicated devices have their own display controls. These specialized magnification devices can be costly and take up space in a home.

Television screens and mobile devices, such as smart phones and tablets, are common devices in homes. Televisions have high quality display capabilities and display tailoring functionalities. Mobile devices typically include some image editing functionalities to enable the images to be displayed on a display screen of the mobile device. Some software applications for magnification can be installed on mobile devices but they generally do not output with high quality at the television and employ complicated user controls to tailor the display to the needs of a viewer.

SUMMARY

The present image magnification system (also called "magnification system") facilitates display of images on a television screen by pairing a television with a mobile device for magnified viewing.

A computer-implemented method is provided as performed by a television of the image magnification system. The method includes the television receiving a launch signal from a multi-functional mobile device that captures at least one image. In response to receiving the launch signal, the television launches an image display application and receives the at least one image from the mobile device. The television conducts image enhancement on the at least one image. At least one viewing control signal is received by the television from the mobile device in response to user input at the mobile device. The enhanced at least one image is displayed at a television screen as a magnified view according to the received at least one viewing control signal.

In some implementations each image is analyzed to determine a type of an object that is a target subject of the at least one image. Display settings may be adjusted for the type of the object based on the analysis and without a need for user input to manually adjust the display settings. The analysis of the image(s) can be via optical character recognition and/or object recognition. In some implementations, the display settings can be adjusted based on the analysis including at least one of a group of settings such as brightness, contrast, reduce transparency, bold text, text size, or color inversion.

In some implementations of the method image enhancement can include upscaling (upconverting) a resolution of the at least one image. For example, the television screen may have at least 4 K resolution capability and the image(s) received by the television has/have a lower resolution content than resolution capability of the television screen. In such instances, the upscaling may include processing the image(s) for display at the resolution capability of the television screen.

In still some implementations, the viewing control signal comprises a zoom signal. A zoom level of the displayed at least one image may be adjusted based on the zoom signal received from the mobile device.

The images may include a video. Displaying of the enhanced video at the television screen may occur in real time during capture of the video by the mobile device.

In various implementations, an apparatus is provided that includes one or more processors of a television and logic encoded in one or more non-transitory media for execution by the one or more processors. When the logic is executed, the processors are operable to perform operations by the television. Such operations include receiving a launch signal from a multi-functional mobile device that captures at least one image, and in response several operations are performed including receiving at least one image from the mobile device. Further, image enhancement may be conducted on the at least one image, at least one viewing control signal may be received from the mobile device in response to user input at the mobile device, and the enhanced at least one image is displayed at a television screen as a magnified view according to the received at least one viewing control signal.

In some implementations, the operations performed by the television may include analyzing the at least one image to determine a type of an object that is a target subject of the at least one image. The operations further may include adjusting display settings for the type of the object based on the analysis and without a need for user input to manually adjust the display settings. The analysis may include optical character recognition and/or object recognition and the display settings may include at least one of: brightness, contrast, reduce transparency, bold text, text size, or color inversion.

The image enhancement performed may include upscaling a resolution of the at least one image. For example, where the television screen has at least 4 K resolution capability and the received at least one image has a lower resolution content than resolution capability of the television screen, the upscaling may include processing the at least one image for display at the resolution capability of the television screen.

In some implementations, the viewing control signal comprises a zoom signal, and the operations may further include adjusting a zoom level of the displayed at least one image based on the received zoom signal.

At time, the at least one image may be a video and the displaying of the enhanced video may occur in real time during capture of the video by the mobile device.

In some implementations, an image magnification system comprises a multi-functional mobile device and a television. The mobile device may include a capture component to capture at least one image. A mobile screen of the mobile device is configured to display the captured image(s) and has first dimensions. The mobile device includes one or more mobile processors; and logic encoded in one or more non-transitory media for execution by the one or more mobile processors and when executed is operable to perform mobile operations. Such operations include transmitting a launch signal to the television to launch an image display application and transmitting at least one viewing control signal to the television. The television of the image magnification system comprises a television screen having second dimensions greater than the first dimensions to display the at least one image in a magnified view. The television includes one or more television processors and logic encoded in one or more non-transitory media for execution by the one or more television processors, which when executed operable to perform television operations in response to receiving the launch signal from a mobile device. The television operations include receiving the at least one image from the mobile device and conducting image enhancement on the at least one image. Operations also include displaying the enhanced at least one image as a magnified view according to the received at least one viewing control signal.

In some implementations, the mobile screen is also configured to display a graphical user interface including control elements to accept user interaction including at least one image viewing control and a launch control.

In still some implementations, the television operations further comprise analyzing the at least one image to determine a type of an object that is a target subject of the at least one image. Display setting may be adjusted for the type of the object based on the analysis and without a need for user input to manually adjust the display settings.

Image enhancement automatically made to the image by the television may include upscaling a resolution of the at least one image. For example, the television screen may have at least 4 K resolution capability, wherein the received at least one image has a lower resolution content than resolution capability of the television screen, and wherein the upscaling includes processing the at least one image for display at the resolution capability of the television screen.

At times, the image(s) include a video and the displaying of the enhanced video may occur in real time during capture of the video by the mobile device.

A further understanding of the nature and the advantages of particular embodiments disclosed herein may be realized by reference of the remaining portions of the specification and the attached drawings.

BRIEF DESCRIPTION OF THE DRAWINGS

The disclosure is illustrated by way of example, and not by way of limitation in the figures in which like reference numerals are used to refer to similar elements.

DETAILED DESCRIPTION OF EMBODIMENTS

Figure 1:
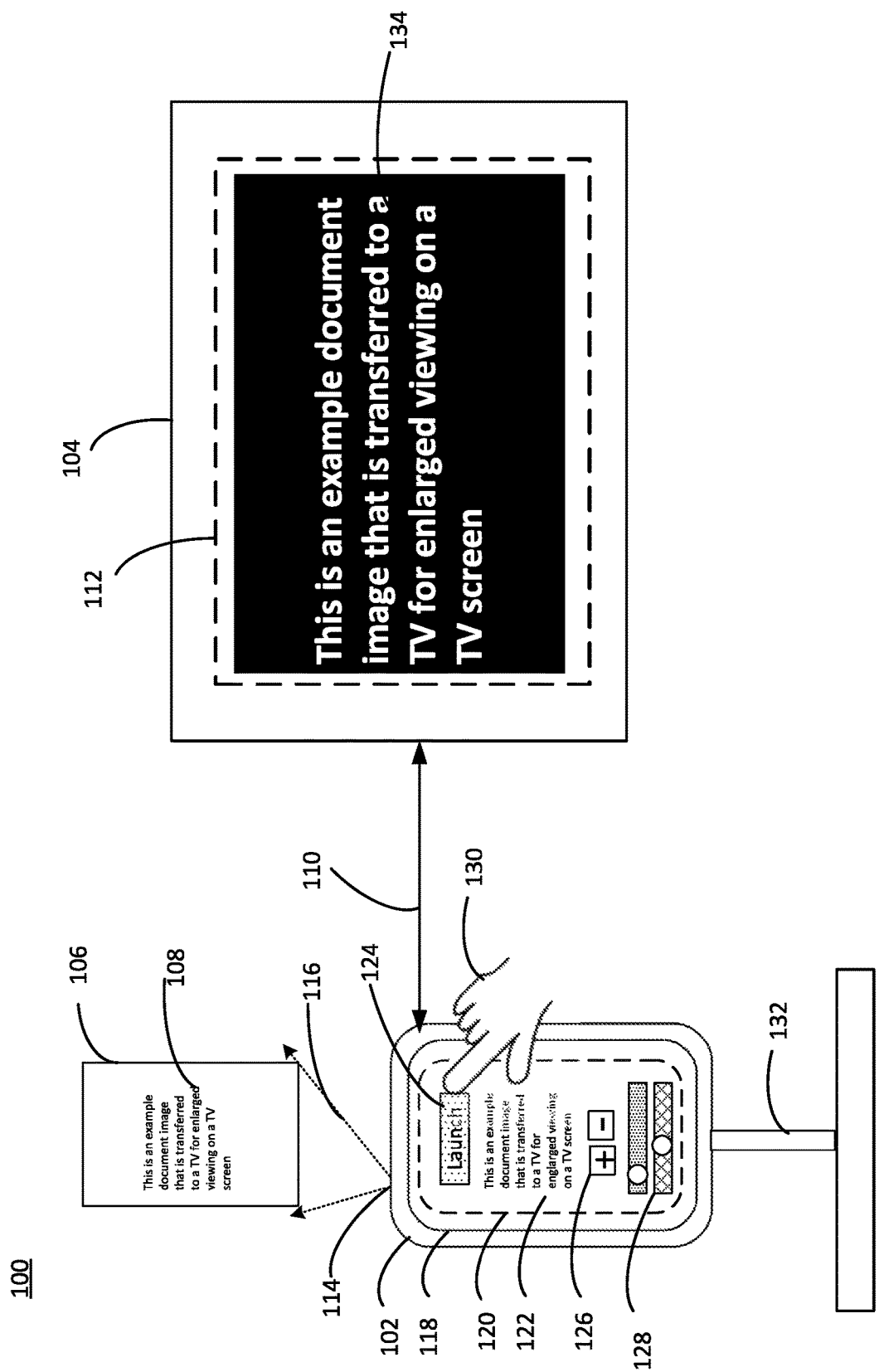
FIG. 1 is a conceptual diagram illustrating an example environment in which various aspects of an image magnification system can be implemented, in accordance with some implementations.

The present image magnification system enables display of images on a television screen by pairing a television with a mobile device for large size viewing on the television screen. The magnification system utilizes fine-tuning elements on the mobile device and television to optimize output of images at the television screen. A coupling application of the mobile device communicates with an image display application of the television. A user may launch the television image display application by interacting with controls at the mobile device. The image can undergo initial processing at the mobile device. Digital images, such as photographs or video, etc., are transferred from the mobile device directly to the television where the images can be enhanced prior to display. Images may include 2-dimensional (2-D) and/or 3-dimensional (3-D) images in which the 3-D information about an object is captured. The magnification system provides for enhanced casting by the television optimizing display settings and/or the image for improved display that is tailored to the viewing needs of the user. The user can also control the way the image is displayed on the television screen by further interacting with mobile device controls to send view control signals to the television.

The mobile device is a multi-functional device of a user. For the purposes of the present discussion, the term "multi-functional" refers to a handheld computing device configured for multiple purposes in addition to the needs of the present image magnification system. For example, a multi-functional device is not dedicated to performing operations of the coupling application or pairing the mobile device with the television for control of enlarged display of an image, as described herein. Nonrelated functions that may be provided by the multi-functional mobile device may include placing and receiving voice and video telephone calls, video games, global positioning system (GPS), capturing images for purposes other than specifically viewing on the television (such as digital cameras and web cameras), etc. A multi-functional mobile device includes a portable computing device such as smart phone, tablet, wearable device, etc. The mobile device applicable for the image magnification system has a form factor conducive to scanning the intended object, such as a document. By comparison, bulky computing devices, such as typical laptop computers and desktop computers may not have a form factor that lends itself to scanning intended objects for use with the image magnification system.

For illustration purposes, an example situation is described in which the image magnification system would assist a user to read fine print on a label of a food package. In the past without the image magnification system, the representative user would hold her smart phone camera over the label with one hand, zoom in with the other hand, and hover back and forth to see the entire text on the label. As she moves her smart phone over the text she keeps adjusting the focus and lighting to try to read the text. She could take a photograph of the label and zoom in on the image displayed on her smart phone screen. With text that is larger than the small smart phone screen she scrolls around to try to read all of the label. If the representative user uses a generic image sharing application, such as Apple Airplay or use image sharing equipment, such as Google Chromecast, to transmit the image to her television, she needs to manually make adjustments to be able to achieve the ideal display of the image to easily read the text. It would be beneficial if the representative user would be able to view an enlarged version of the entire label on a screen large enough to accommodate the content and with automatic settings and image enhancements to optimize viewing.

With the present image magnification system, the representative user activates a coupling application on the smart phone by touching an icon on her smart phone screen and her smart phone couples with a television of the representative user. A graphical user interface configured for the image magnification system is displayed on the screen of the smart phone. She touches a launch control element on the GUI and takes a photograph of the label. Her smart phone displays the photograph on the screen of the smart phone. The image display application on her television is automatically activated upon touching the launch control element and the photographic image is transferred from her smart phone to her television.

The television analyzes the received image and determines that text is depicted in the image. The television adjusts display settings to invert image color of black text on a white background to display white text on a black background. In addition, the 4K television performs upscaling on the image to make the lower resolution image compatible with the television screen. The color inversion (also referred to as black and white inversion) and enlargement of the text on the larger screen enables the text to be easier read by the representative user.

The image magnification system is not limited to the use case described above. As can be recognized by the description herein, there are numerous other situations in which the image magnification system may be employed to display different types of images using various mobile devices and televisions.

By comparison to the present image magnification system, other magnification devices may require dedicated hardware that can be bulky and costly, like a standalone CCTV and video magnifier devices. The screen size of these dedicated devices can be lesser quality than provided by televisions. Common magnification applications do not pair with televisions or fail to provide convenient controls for viewing on a television screen. Some image sharing applications and equipment have limited quality capacity, for example, capture low quality images and/or the images are downgraded in quality as they are transmitted to a television, which result in poor quality display of the image on a television screen. These prior systems may not sufficiently improve a poorly capture image. It is desirable to implement the present image magnification system to provide a tailored experience for a user in paring a mobile device with a television. It is beneficial for the magnification system to improve the quality of a display of an image at the television.

FIG. 1 is a block diagram showing an image magnification system 100 that includes a mobile device 102 and television 104. The mobile device 102 captures an image of an object, such as a document 106 that has text 108, transfers the image across network 110 to the television 104 for display on a television screen 112, and controls rendering of the image on the television through various control components of the coupling application.

The mobile device 102 is a multi-functional computing device that includes a memory, a hardware processor, and a coupling application. For example, the mobile device 102 may be a handheld device, such as a smart phone, personal digital assistant, phablet, digital camera, web camera, a tab device, a wearable electronic devices, tablet, electronic book, 2 in 1 PC, or other such portable devices capable of transferring images and interfacing with the television and which may be employed with the coupling application. In some implementations, the coupling application may be downloaded to the mobile device. In other implementations, the mobile device may be preinstalled with the coupling application. Wearable mobile devices may include, for example, smart watches, smart glasses, electronic headgear, virtual reality (VR) and augmented reality (AR) devices, smart jewelry, smart clothing, wearable health trackers, etc.

The mobile device 102 may include a capture component 114 having one or more image sensors, e.g., cameras, that detect the document 206 within a field of vision 116 of the capture component 114. A mobile screen 118 of the mobile device 102 may display the image 122 including a depiction of the text 108 on a graphical user interface (GUI) 120.

The mobile screen 118 is typically an integral component of the mobile device 102. The mobile screen may be a flat liquid crystal display (LCD), organic light-emitting diode (OLED) or other LED screen. In some implementations, at least a portion of the mobile screen 118 may include a touch screen.

The mobile screen 118 is sized to be smaller than the television screen 112. For example, the dimensions, e.g., vertical height and horizontal width, screen area, aspect area, diagonal measurement, or other measurements of screen size, are sufficiently small for the device to be mobile when used by the user and smaller in comparison to the same measurements of the television screen 112. By virtue of the mobile screen size compared to the television screen size, the image appears enlarged when displayed on the television screen than the mobile screen. Display of the image on the television screen may also undergo enhancements and display settings adjusted to further aid in a user viewing the image on the television screen.

A GUI 120 of the mobile device may include a display of multiple control elements to receive interactions of a user 130, e.g., touch, to control features of the image displaying on the television. Control elements may include a launch control element 124 to initiate launching of the image display application at the television and various image viewing control elements to direct rendering properties of how the image is shown at the television. The image viewing control elements may include a zoom in/out control elements 126, and control sliders 128, for example to adjust rendering properties of contrast, color (such as applying a color filter and increase white levels), brightness, transparency, bold text, text size, color inversion, etc. In some implementations, the user may use control elements at the mobile device to perform underlining or otherwise highlighting of specific portions of text in the image on the television.

The image viewing control elements may be adjusted by the user 130 as the user views the image on the television screen to manipulate the image displaying on the television. For example, the user may make additional adjustments of rendering properties of the television through rendering control elements on the GUI 120 of the mobile device or through various other user inputs to the mobile device. In some implementations, the features of the control elements may also be preset by the user 130 prior to transfer of the image from the mobile device 102 to the television 104 and optionally may be further adjusted by the user 130 after the image is displayed on the television 104. The user control inputs may be transmitted as control signals to the television for processing at the television. Various signals may be employed, such as radio frequency signals, infrared signals, any electronic transmissions described below with regard to network 110, etc.

In some implementations, mobile control components, e.g., software components of the coupling application, may receive user input such as commands via various types of user interactions, such as voice commands. Gestures may be employed for user input by moving a part of the user body or moving an object in a particular manner that is detected by a sensor of the mobile device. The coupling application enables the user to controlling display of the image on the television to provide a simple and tailored viewing experience for the user. The user need not open up various control programs and rely on complicated manual controls to pair with the television and display the image in a manner best suited for the vision needs of the user. Pairing through the present image magnification system enables direct coupling for the purpose of viewing the image for simple useability and greater utility. The user need not navigate through various user interfaces or employ different image capture devices, transmitters, and receivers.

In some implementations, the mobile device 102 may be held in place in relation to the object by a stand 132. The stand may include a support (e.g., arm) to which the mobile device attaches. Various types of stands are possible including mechanically adjusting stands, fixed stands, assembled cardboard stands (e.g., from a crate or box), etc. The object may also be placed on a platform (not shown) of the stand in a consistent position relative to the camera of the mobile device 102. In some implementations, display settings of the television may be preset according to a regular position of the mobile device coupled to the stand and consistent position of the object being captured. For example, in viewing documents with a same size and font text, such as a book, the control element features may be preset and not adjusted with each document (e.g., page) viewed. The stand may further facilitate easy activation of control elements on the mobile device by a user 130.

Figure 4:
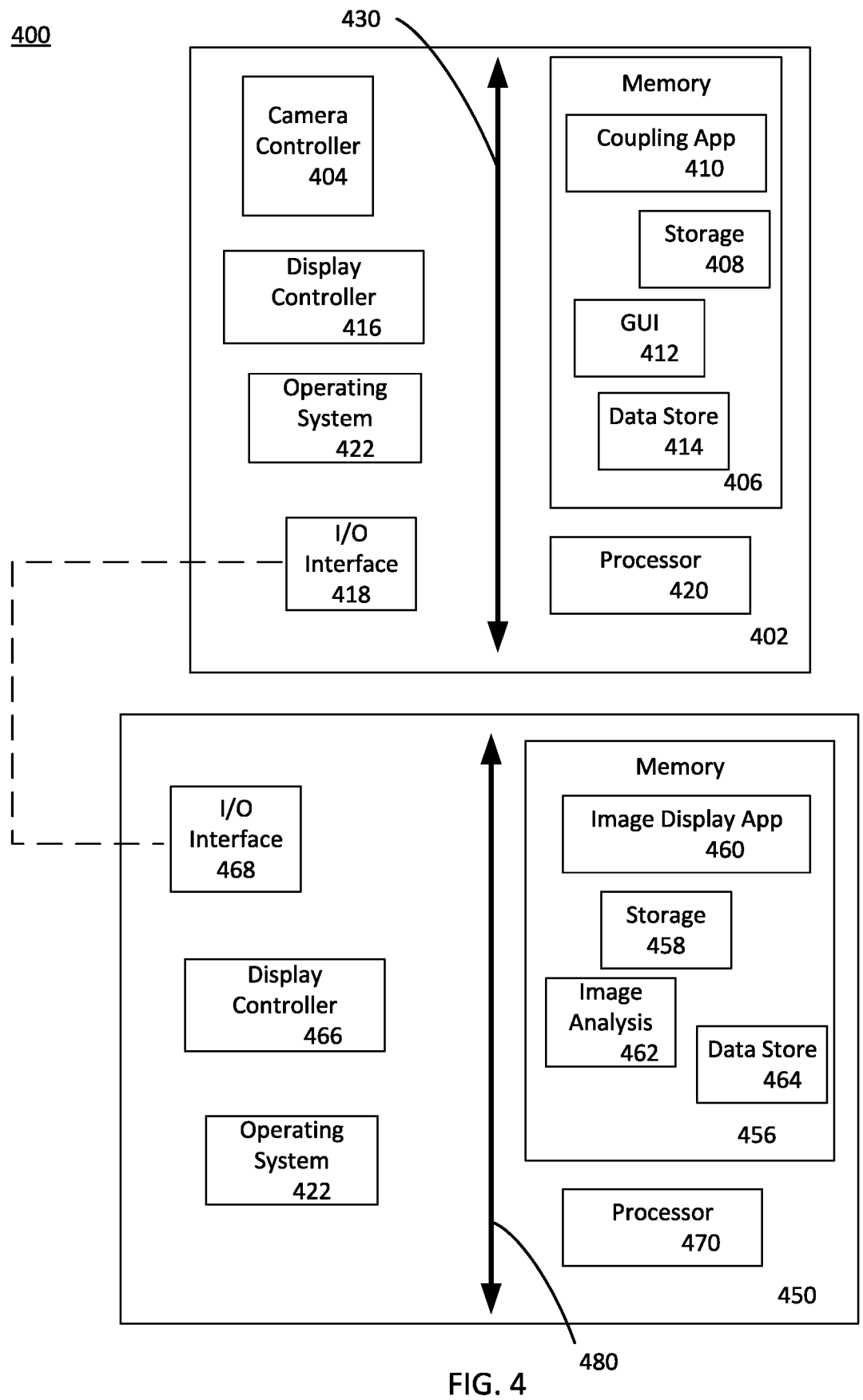
FIG. 4 is a block diagram of components of the image magnification system usable to implement in the processes of FIGS. 2 and 3, in accordance with some implementations.

Upon activation of the control elements, signals may be transmitted from an output interface of the mobile device (such as I/O interface 418 in FIG. 4) to an input interface of the television (such as I/O interface 468 in FIG. 4). In some implementations, the television may automatically adjust display settings for the rendering properties of the television screen based on analysis of the image by the television. Display settings may be adjusted for the type of the object based on the analysis and without a need for user input to manually adjust the display settings, although the user may have the option of overriding the automatic settings or further manually adjusting the display settings. The television displayed image 134 on the television screen 112 with the depiction of the text appears enlarged as compared to the smaller depiction of the mobile device displayed image 122 with text on the mobile screen 118.

Communication between the mobile device 102 and the television 104 may employ any suitable electronic communication for travel across the communication path of network 110. One or more networks 110 may be used for one or two way communication between the mobile device 102 the television 104 and optionally one or more additional computing resources. The network 110 may connect devices using physical wires, such as High-Definition Multimedia Interface (HDMI) cables, and/or also be wireless, such as WiFi, Bluetooth™, near field communication (NFC), etc. In some examples, the network 110 may include one or more cellular networks and/or the Internet, among other networks. In some examples, a local network such as a Bluetooth™ network is employed for communication between the mobile device and television. The network 110 could take other forms as well such as including one or more WANs (Wide-Area Networks) and/or LANs (Local-Area Networks). Typically, the communication path provided by the network 110 is configured for communication over a short distance, such as within a same room.

Where a wireless network 110 is employed, the network may operate according to one or more communication protocols, such as Bluetooth™, LTE (Long-Term Evolution), CDMA (Code Division Multiple Access), WiMax (Worldwide Interoperability for Microwave Access), WiFi (Wireless Fidelity), WiFi Direct (Wireless Fidelity Direct), EDGE (Enhanced Data rates for GSM (Global System Mobile) Evolution), 3G (Third Generation), 4G (Fourth Generation), HTTP (Hyper-Text Transfer Protocol), TCP (Transmission Control Protocol), SIP (Session Initiation Protocol), device contact based transfer protocols, and other communication protocols.

The image may be transmitted from the mobile device to the television via various techniques including screen mirroring or screen casting utilizing a mobile operating system. In screen casting, the mobile device may not display the image at the same time that the image is displayed on the television, whereas simultaneous displays may be used with screen mirroring. The image magnification system may further use secure transfer techniques to protect transmission between the mobile device and television. In some implementations the image as transferred from the mobile device to the television may be a raw image or may be a high dynamic range (HDR) images.

In some implementations, the television 104 may be a high resolution or a high number of pixels per inch (PPI) such as full high definition, 4 K (kilo) or greater, such as ultra-high definition, e.g., 8 K (horizontal resolution of about 8000 pixels), 10 K, and higher. For example, the television screen may be 8 K with 7680 horizontal pixels and 4320 vertical pixels for a total of 33 million pixels. In some implementations, the image may be transmitted to the television at a lower resolution than the television screen. The television may enhance the image for better display, as described in detail in FIG. 2 below.

Figure 2:
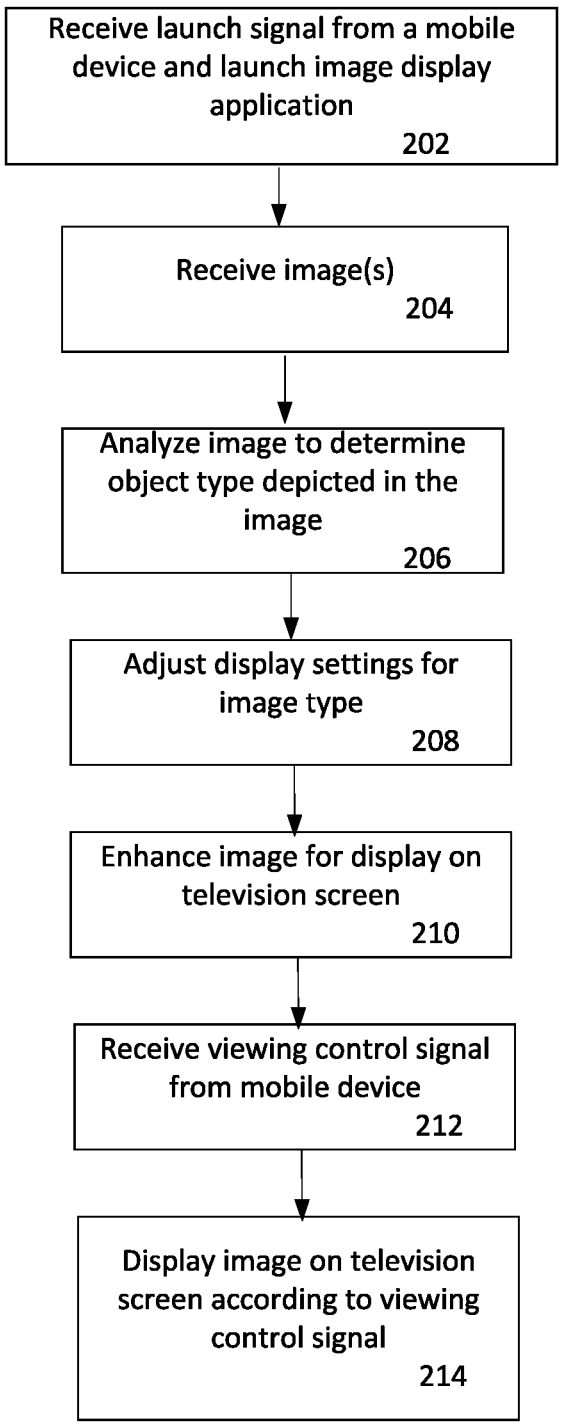
FIG. 2 is a is a flow diagram of an example method for a television to display images from a mobile device for enlarged viewing, in accordance with some implementations.

FIG. 2 is a flow chart of a process 200 for a television to display images from a mobile device for enlarged viewing, and may be performed, for example, by the television 104 of the image magnification system 100 shown in FIG. 1 and television components of television 500 in FIG. 5. Pairing of a coupling application of the mobile device with the image display application of the television allows for optimal viewing of an image depicting an object that is tailored for a user, such as a vision challenged individual, previously reserved for dedicated magnification devices.

In block 202, the television receives a launch signal from the mobile device using network (such as network 110 with regard to FIG. 1). The television responds to the received launch signal by opening an image display application. In some implementations, the launch signal may include an image transmitted, e.g. via WiFi, from the mobile device to the television and upon receipt of the image, the image display application is launched.

In block 204, one or more images, including photographs and/or videos, are received by the television from the mobile device. The received image may be a low resolution image that is upscaled by the television for viewing on the television screen. In some implementations, the images may include a video. The steps 204 to 214 may occur in real time as the video is streamed to the television from the mobile device. Thus, the video is enhanced and displayed at the television screen may appear to be concurrent with or close to simultaneous with capturing of the video. For real time display, the video may be recognized as a group of images and one image or a small sample of images may be analyzed. The other images of the group are assumed to have similar characteristics and are enhanced in a same manner and displayed with same display settings.

In block 206, the image is analyzed to determine the type of an object that is a target subject (also referred to as a relevant object or significant object) of the image. For example, the object may be determined to be a document, label, or screen of another device with text. For the purpose of this disclosure, text may include letters, numbers, symbols, and/or emojis.

In some implementations, the image analysis may include optical character recognition (OCR) to determine text and/or interpret identified text depicted in the image. As an additional feature, the television may recognize the text through OCR and read at least a portion of the text in the image to the user as the text is displayed on the television screen.

In some implementations, the image analysis may include various object recognition processes to identify a target subject captured by the image. In some implementations, in order to recognize a target subject in images, the object in the image may be matched with objects in comparison images. In some implementations, the image analysis may include extracting features from the object in the image for analysis, and then comparing the extracted features to similar or same features of one or more images. To facilitate in object recognition, geometric recognition algorithms and/or photometric algorithms based on a statistical approach, may be employed. Other recognition algorithms may be used, which can include principal component analyses, linear discriminant analysis, elastic bunch graph matching, hidden Markov models, and dynamic link matching. It will be appreciated that other known or later developed image analysis techniques may be utilized.

In some implementations, a priority of object types may be employed to determine a target subject of the image where the image includes more than one object. In various implementations, where text is detected in an image, the text may be prioritized as a target subject of the image. For example, for an image of a food package with a label having text is shown sitting on a countertop with other objects on the countertop. In this example, the text of the label may be determined to the target subject since text is categorized as a priority object. In some implementations, image analysis may further include determining a characteristic of the identified object, such as a series of images of a video is determined to depict an object in motion. Objects in motion may be prioritized and the television may employ anti-blur functionalities to improve viewing of the object in motion.

In some implementations, the image analysis described above may be performed by the mobile device or other external computing device instead of or in addition to the television. The results of the analysis by external devices may be transmitted to the television to perform the adjustment steps in block 208.

In block 208, display settings of the television and/or television screen are automatically adjusted by the television, based on the type of object that is the target subject of the image or based on the type of image for display. The image display application may use default display settings and adjustments may be made to change the default display settings based on the image(s) being processed. The display setting adjustments facilitate easier viewing of the object by the user. Where the target subject of the image is text, the image adjustments are specific for making the text easier to read. For example, the adjustment may include color inversion, such as an image that is black text with a white background changed to be displayed as white text on black.

Other image display setting adjustments may include automatic positioning adjustments, for example, rotating an image if the image is found to be sideways or upside down. Positioning adjustments may also include shifting the image to place a relevant object in the center of the screen and/or zooming in on the centered object. In some implementations, the user may employ controls on the mobile device to point to relevant objects in the image and direct the television to reposition the image to bring the relevant object to a portion of the screen, such as center or top left for easy reading. In some implementations, recognition of relevant objects and repositioning of the image is performed automatically by the television without required input from the user. Other positioning type adjustments may include switching between landscape view and portrait view to better view an important object determined to be depicted in the image, automatic cropping out of unnecessary objects or scenery in the image to better focus on the important object that is the target subject of the image, etc.

Display setting adjustments may also include automatic clarity based adjustments, such as brightness, contrast, reduce transparency, bold text, text size, or color inversion. For example, the lighting of the display and/or image, or portions thereof, may be varied to brighten particular relevant objects and/or darken insignificant objects or scenery in the image that are not the target subject in the image, changing contrast, adjusting white levels and brightness, etc. For example, when it is determined through image analysis that the image contains text, the brightness level of the display may automatically increase, which may be a level above the brightness typically used for displaying other content, such as streaming programs on the television. Other display setting changes are possible that are known or may be known in the future and that are based on content determinations from image analysis.

In block 210, the image is enhanced for display on the television screen, In some implementations, the screen of the television is a higher resolution, e.g., 4 K, 8 k, 10 K, or higher resolution, than the resolution of the mobile screen.

In some implementations, image enhancement may include upscaling the received image by the television, to increase image detail for the higher resolution television screen. By upscaling the image, a lower quality image may be acceptable to be transmitted from the mobile device to the television. The lower quality transmitted image may require less bandwidth and increase transmission speed of the image from the mobile device to the television.

In some magnification systems, image enhancements, such as upscaling, and/or adjustments to display settings may employ artificial intelligence (AI) models. For example, image characteristic information, such as particular objects present in the images and types of images, are stored in a database of the memory of the television. Upscaling parameters, image enhancement parameters, and/or display setting used to display prior images on the television screen (or similar television screens) may be used for future images having similar or same characteristics and/or types.

In some implementations, the image enhancements may be based on an identified characteristic of the object, such as correcting image blur of an object determined to be in motion in one or more images. In some implementations, a category of image, such as sports, determined, for example, through image analysis may result in certain television presets for the image category, such as automatic blur fixing for sports images and applying color filters for text images. Other image enhancements are possible that are known or may be known in the future and that are based on content determinations from image analysis.

In block 212, the television receives one or more viewing control signals from the mobile device. In some implementations, viewing control signals are generated by the mobile device in response to user input. For example, through a graphical user interface on a screen of the mobile device, the user may interact with a zoom level control, e.g., zooming in/out or move a zoom window to control zoom in various portions of the image. The mobile device may respond to such user interaction by sending viewing control signals to the television, which when received by the television triggers display functions to zoom in and/or out on the image displayed on the television screen. Other viewing control may move the image on the television screen, vary a focus area of the zoom, etc. In block 214, the enhanced image is displayed on the television screen according to the viewing control signal(s) received from the mobile device.

In some implementations the steps 204 through 214 may be performed for each image transferred from the mobile device to the television by the image magnification system. In some implementations groups of images, such as images in a video or photo burst may be identified by the magnification system. The images in the group may be treated as a single image in conducting steps 206 to 214, where image analysis may be performed on a single representative image or a few sample images. Image adjustment may be performed on all images of the group and display settings may be the same for displaying images in the group.

In some implementations, an additional text to speech reading may be integrated with the television visual display of the text. For example, as an image with text is displayed on the television, a user may use the mobile device to point to particular text on the television display screen. The television may use optical character recognition and audio functionality to read out loud the particular text.

The methods of FIG. 2 described herein can be performed via software, hardware, and combinations thereof. For example, the process may be carried out in software, such as one or more steps of the process carried out by the image display application of the television. Although the description has been described with respect to particular embodiments thereof, these particular embodiments are merely illustrative, and not restrictive.

Figure 3:
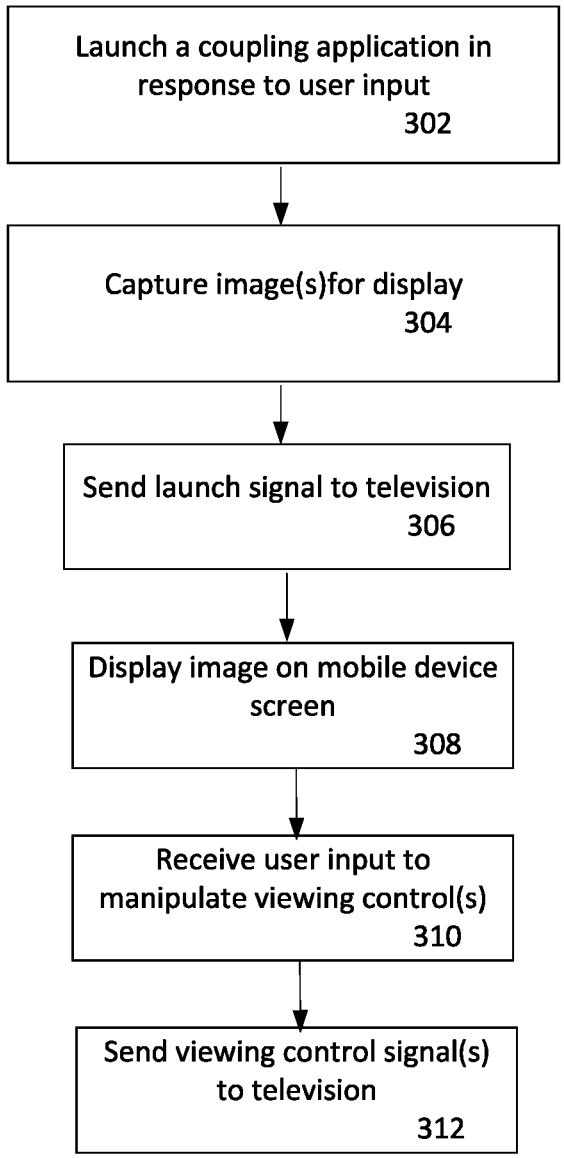
FIG. 3 is a flow diagram of an example method for a mobile device to couple with a television for display of an image in an enlarged view, in accordance with some implementations.

FIG. 3 is a flow chart of a process 300 for a mobile device to couple with a television for display of an image in an enlarged view, and may be performed, for example, by the mobile device 102 of the image magnification system 100 shown in FIG. 1 and mobile device components of mobile device 400 in FIG. 4.

In block 302, the mobile device receives user input for activating a coupling application of the mobile device and in response, the mobile device launches the coupling application. For example, the user input may include the user interacting, e.g., touch, tap one or more times, swipe, etc., with an icon on a display screen of the mobile device. Other user inputs may include voice, sounds, gestures, etc., by the user or controlled by the user.

In some implementations, the mobile device captures one or more images, in block 304. In other implementations, the mobile device receives the image(s) from an external image capture device. In some implementations, the image is received or captured by the mobile device before launching the coupling application. In such cases, the use may provide input to indicate the image(s) to be displayed by the television by the image magnification system.

In block 306, the coupling application triggers transmission of launch signals to be received by the television. The signals may be transmitted via wireless or wired mechanisms, as described above, for example via network 110 in FIG. 1.

Optionally, in block 308 the image(s) may also be displayed on a mobile device screen. For example, if communication with the television is through screen mirroring techniques, the image may be shown on both the mobile device and the television at the same time. In other implementations, such as employing screen casting, the image in only displayed on the television rather than both the mobile device and television.

In block 310, the mobile device may receive user input that manipulate viewing controls for the rendering of the image on the television screen (and rendering on the mobile device screen if shown in both screens). In block 312, viewing control signals generated based on the user inputs, are sent to the television.

The methods of FIG. 3 described herein can be performed via software, hardware, and combinations thereof. For example, the process may be carried out in software, such as coupling application 410 in FIG. 4 below. Although the description has been described with respect to particular embodiments thereof, these particular embodiments are merely illustrative, and not restrictive.

The methods can be implemented by computer program instructions or code, which can be executed on a computer. In some implementations, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system).

Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processing units (GPUs), Application Specific Integrated Circuits (ASICs), and the like. One or more methods can be performed as part of or component of an application running on the system, or as an application or software running in conjunction with other applications and an operating system.

FIG. 4 is a block diagram of the image magnification system 400 and components of a mobile device 400 usable to implement the processes described, such as the processes of FIG. 3, and a television 450 used to implement the processes described, such as the processes of FIG. 2. The mobile device 402 and television 450 are merely illustrative and not intended to limit the scope of the claims. One of ordinary skill in the art would recognize other variations, modifications, and alternatives.

Mobile device 402 typically include familiar computer components such as a processor 420, and memory storage devices, such as a memory 406, e.g., random access memory (RAM), storage 408. A bus 430 may interconnect computer components. It will be readily apparent to one of ordinary skill in the art that many other hardware and software configurations are suitable for use with the present invention.

A camera controller 404 may be provided in the mobile device 402 in some implementations of the image magnification system 400. The camera controller 404 may operate various capture component(s) of the mobile device, such as capture component(s) 114 in FIG. 1. The captured or retrieved images may be stored in storage 408 of memory 406. In some implementations, the images may be stored in other storage units accessible to the mobile device 402.

Memory 402 and storage 408 are examples of tangible, non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 414 may be employed to store various other on-board data.

Memory 406 also includes the coupling application 410 to perform various operations when executed by the processor 420 of the mobile device to couple to the television 450. The operations include, and are not limited to, sending launch signals to the television, receiving user input to manipulate viewing controls and sending viewing control signals to the television, for example, one or more steps 302-312 in FIG. 3.

One or more computer programs, such as coupling application 410 may be provided in memory 406. The computer programs may also be referred to as programs, software, software applications or code, may also contain instructions that, when executed, perform one or more methods, such as those described herein. The computer program may be tangibly embodied in an information carrier such as computer or machine readable medium, for example, the memory 406, storage device or memory on processor 420. A machine readable medium is any computer program product, apparatus or device used to provide machine instructions or data to a programmable processor.

The mobile device includes a display controller 416 to control a screen of the mobile device. For example, a graphical user interface 412 in memory 406 may be displayed via display controller 416. In some implementations, the image in storage 408 may also be displayed on the mobile screen.

The mobile device 402 includes an input/output (I/O) interface 418 to communicate with the computing devices including the television 450. The I/O interface may represent a combination of a variety of communication interfaces to communicate to and from the television 450 as described above with regard to network 110 in FIG. 1.

A network interface may include a network interface card, an Ethernet card, a modem (telephone, satellite, cable, ISDN), (asynchronous) digital subscriber line (DSL) unit, and the like. Further, a network interface may be physically integrated on a motherboard, may be a software program, such as soft DSL, or the like.

The mobile device may also include software that enables communications of I/O interface 410 over the network such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network may include a local area network, a wide area network, a wireless network, an Intranet, the Internet, a private network, a public network, a switched network, or any other suitable communication network, such as for example Cloud networks. Network may include many interconnected computer systems and any suitable communication links such as hardwire links, optical links, satellite or other wireless communications links such as BLUETOOTH, WIFI, wave propagation links, or any other suitable mechanisms for communication of information. For example, network may communicate to one or more mobile wireless devices 956A-N, such as mobile phones, tablets, and the like, via a base station such as a wireless transceiver.

Mobile device 402 further includes operating system 422, which may refer to a single operating system or a combination of operating systems within the mobile device 402.

The operating system 422 may include a mobile operating system or other computing operating systems, e.g., desktop operating systems employed by mobile laptop computers. In some implementations, the operating system 422 may allow for downloading and running of the coupling application onto the mobile device 402.

The television 450 typically include familiar computer components such as a processor 470, and memory storage devices, such as a memory 456, e.g., random access memory (RAM), storage 458. A bus 480 may interconnect computer components. It will be readily apparent to one of ordinary skill in the art that many other hardware and software configurations are suitable for use with the present invention.

The memory 456 and storage 458 of the television are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 464 may be employed to store various other on-board data, such as AI models, database(s)s of image characteristics and corresponding image enhancement and/or display setting parameters, etc.

One or more computer programs, such as image display application 460 may be provided in memory 456. Memory 406 also includes the coupling application 410 to perform various operations when executed by the processor 420 of the mobile device to couple to the television 450. The operations include, and are not limited to, receiving launch signals from the mobile device, receiving and analyzing images, adjusting display settings, enhancing images, receiving viewing controls, and displaying images, for example, one or more steps 202-214 in FIG. 2.

The computer programs may also be referred to as programs, software, software applications or code, may also contain instructions that, when executed, perform one or more methods, such as those described herein. The computer program may be tangibly embodied in an information carrier such as computer or machine readable medium, for example, the memory 406, storage device or memory on processor 420. A machine readable medium is any computer program product, apparatus or device used to provide machine instructions or data to a programmable processor.

An image analysis module 462 may be provided in memory 406 to perform the analysis of the content of the image, such as the processes described in block 206 in FIG. 2. In some implementations, the image analysis may be part of the image display application 460, or a separate module that feeds analysis results to the image display application 460 to determine any adjustments to display settings for the television screen particular to the image and its contents.

The image, as received from mobile device 402 and/or as enhanced by image display application 460, may be stored in storage 458.

A data store 464 may include data used in the display process. For example, data store may include an image processing records, user profiles including viewing preferences of particular users, etc.

The television 450 includes a display controller 466 to control a screen of the television. For example, the display controller 466 may control the display of the processed image(s) on the screen of the television. Display controller 466 may control and adjust display settings in response to image analysis.

The television 450 includes an I/O interface 468 may represent a combination of a variety of communication interfaces to communicate to and from the television 450. The I/O interface 468 may be similar to the I/O interface 418 of mobile device 402, which description above may be applied to I/O interface 468.

Although the description of the image magnification system is described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A computer-implemented method performed by a television, the method comprising:
   receiving a launch signal from a multi-functional mobile device that captures at least one image;
   in response to receiving the launch signal:
   receiving the at least one image from the mobile device;
   analyzing the at least one image including performing optical character recognition and/or object recognition on the at least one image to determine a type of an object that is a target subject of the at least one image;
   adjusting at least one display setting for the type of the object based, at least in part, on the analyzing and without a need for user input to manually adjust the at least one display setting;
   conducting image enhancement on the received at least one image;
   receiving at least one viewing control signal from the mobile device in response to user input at the mobile device; and
   displaying the enhanced at least one image at a television screen as a magnified view according to the received at least one viewing control signal.

2. The method of claim 1, wherein the at least one display setting include at least one of: brightness, contrast, reduce transparency, bold text, text size, or color inversion.

3. The method of claim 1, wherein the image enhancement includes upscaling a resolution of the at least one image.

4. The method of claim 3, wherein the television screen has at least 4K resolution capability, wherein the received at least one image has a lower resolution content than resolution capability of the television screen, and wherein the upscaling includes processing the at least one image for display at the resolution capability of the television screen.

5. The method of claim 1, wherein the viewing control signal comprises a zoom signal, and the method further comprises:
   adjusting a zoom level of the displayed at least one image based on the received zoom signal.

6. The method of claim 1, wherein the at least one image is a video and the displaying of the enhanced video occurs in real time during capture of the video by the mobile device.

7. The method of claim 1, wherein the at least one display setting includes a positioning adjustment including rotating the image and/or repositioning the image to bring the object to a portion of the television screen.

8. An apparatus comprising:
one or more processors of a television; and
logic encoded in one or more non-transitory media for execution by the one or more processors and when executed operable to perform operations by the television, comprising:
receiving a launch signal from a multi-functional mobile device that captures at least one image;
in response to receiving the launch signal:
receiving at least one image from the mobile device;
analyzing the at least one image including performing optical character recognition and/or object recognition on the at least one image to determine a type of an object that is a target subject of the at least one image;
adjusting at least one display setting for the type of the object based, at least in part, on the analyzing and without a need for user input to manually adjust the at least one display setting;
conducting image enhancement on the at least one image;
receiving at least one viewing control signal from the mobile device in response to user input at the mobile device; and
displaying the enhanced at least one image at a television screen as a magnified view according to the received at least one viewing control signal.

9. The apparatus of claim 8, wherein the at least one display setting include at least one of: brightness, contrast, reduce transparency, bold text, text size, or color inversion.

10. The apparatus of claim 8, wherein the image enhancement includes upscaling a resolution of the at least one image.

11. The apparatus of claim 10, wherein the television screen has at least 4K resolution capability, wherein the received at least one image has a lower resolution content than resolution capability of the television screen, and wherein the upscaling includes processing the at least one image for display at the resolution capability of the television screen.

12. The apparatus of claim 8, wherein the viewing control signal comprises a zoom signal, and the operations further comprise:
adjusting a zoom level of the displayed at least one image based on the received zoom signal.

13. The apparatus of claim 8, wherein the at least one image is a video and the displaying of the enhanced video occurs in real time during capture of the video by the mobile device.

14. The apparatus of claim 8, wherein the at least one display setting includes a positioning adjustment including rotating the image and/or repositioning the image to bring the object to a portion of the television screen.

15. An image magnification system comprising:
a multi-functional mobile device comprising:
a capture component to capture at least one image;
a mobile screen configured to display the at least one image, the mobile screen having first dimensions;
one or more mobile processors; and
logic encoded in one or more non-transitory media for execution by the one or more mobile processors and when executed operable to perform mobile operations comprising:
transmitting a launch signal to a television to launch an image display application; and
transmitting at least one viewing control signal to the television; and
the television comprising:
a television screen having second dimensions greater than the first dimensions to display the at least one image in a magnified view;
one or more television processors; and
logic encoded in one or more non-transitory media for execution by the one or more television processors and when executed operable to perform television operations in response to receiving the launch signal from a mobile device, the television operations comprising:
receiving the at least one image from the mobile device;
analyzing the at least one image including performing optical character recognition and/or object recognition on the at least one image to determine a type of an object that is a target subject of the at least one image;
adjusting at least one display setting for the type of the object based, at least in part, on the analyzing and without a need for user input to manually adjust the at least one display setting;
conducting image enhancement on the at least one image; and
displaying the enhanced at least one image as a magnified view according to the received at least one viewing control signal.

16. The system of claim 15, wherein the mobile screen is further configured to display a graphical user interface including control elements to accept user interaction including at least one image viewing control and a launch control.

17. The system of claim 15, wherein the image enhancement includes upscaling a resolution of the at least one image.

18. The system of claim 17, wherein the television screen has at least 4K resolution capability, wherein the received at least one image has a lower resolution content than resolution capability of the television screen, and wherein the upscaling includes processing the at least one image for display at the resolution capability of the television screen.

19. The system of claim 15 wherein the at least one image is a video and the displaying of the enhanced video occurs in real time during capture of the video by the mobile device.

* * * * *